US010341877B2

(12) United States Patent
Ganu et al.

(10) Patent No.: US 10,341,877 B2
(45) Date of Patent: Jul. 2, 2019

(54) SYSTEM, APPARATUS AND METHOD FOR MANAGING CLIENT DEVICES WITHIN A WIRELESS NETWORK

(71) Applicant: Hewlett Packard Enterprise Development LP, Houston, TX (US)

(72) Inventors: Sachin Ganu, San Jose, CA (US); Ken Kaho Chan, San Jose, CA (US); Partha Narasimhan, Saratoga, CA (US); Pradeep Iyer, Cupertino, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/101,008

(22) Filed: Aug. 10, 2018

(65) Prior Publication Data

US 2019/0007842 A1    Jan. 3, 2019

Related U.S. Application Data

(63) Continuation of application No. 15/664,923, filed on Jul. 31, 2017, now Pat. No. 10,057,784, which is a (Continued)

(51) Int. Cl.
*H04W 16/14* (2009.01)
*H04W 12/08* (2009.01)
(Continued)

(52) U.S. Cl.
CPC .......... *H04W 16/14* (2013.01); *H04B 17/318* (2015.01); *H04L 43/16* (2013.01);
(Continued)

(58) Field of Classification Search
CPC ...... H04W 16/14; H04W 12/08; H04W 24/08; H04W 48/02; H04W 48/20; H04W 76/18; H04W 84/12; H04B 17/318; H04L 43/16
See application file for complete search history.

(56) References Cited

U.S. PATENT DOCUMENTS 7,181,211 B1    2/2007    Phan-Anh
7,340,247 B1    3/2008    O'Hara et al.
(Continued)

OTHER PUBLICATIONS

Final Office Action, U.S. Appl. No. 11/305,910, dated Jul. 21, 2009, pp. 1-25.
(Continued)

*Primary Examiner* — Duc C Ho
(74) *Attorney, Agent, or Firm* — Hewlett Packard Enterprise Patent Department

(57) ABSTRACT

According to one embodiment, a system and computer-readable storage medium for storage of software directed to the management of associations between network devices is described. The computer-readable storage medium comprising instructions which, when executed by at least one hardware processor on a network device, causes performance of operations, comprising: (1) determining a desired operating state for a client device under analysis, the client device being associated with a first network device of a plurality of network devices; (2) detecting if a triggering event has occurred based on a comparison of the desired operating state for the client device under analysis to an actual operating state for the client device under analysis; and (3) in response to detecting that the triggering event has occurred, causing the client device to wirelessly connect to a second network device of the plurality of network devices in lieu of the first network device.

6 Claims, 9 Drawing Sheets

Related U.S. Application Data continuation of application No. 15/138,663, filed on Apr. 26, 2016, now Pat. No. 9,723,491, which is a continuation of application No. 14/065,326, filed on Oct. 28, 2013, now Pat. No. 9,326,313, which is a continuation-in-part of application No. 13/195,720, filed on Aug. 1, 2011, now Pat. No. 9,936,441.

(51) Int. Cl.

| | | |
|---|---|---|
| *H04W 48/02* | (2009.01) | |
| *H04W 48/20* | (2009.01) | |
| *H04B 17/318* | (2015.01) | |
| *H04L 12/26* | (2006.01) | |
| *H04W 24/08* | (2009.01) | |
| *H04W 84/12* | (2009.01) | |
| *H04W 76/18* | (2018.01) | |

(52) U.S. Cl.
CPC ........... *H04W 12/08* (2013.01); *H04W 24/08* (2013.01); *H04W 48/02* (2013.01); *H04W 48/20* (2013.01); *H04W 76/18* (2018.02); *H04W 84/12* (2013.01)

(56) References Cited

U.S. PATENT DOCUMENTS

| | | | |
|---|---|---|---|
| 7,929,508 | B1 | 4/2011 | Yucek et al. |
| 7,948,953 | B2 | 5/2011 | Melkote et al. |
| 8,363,617 | B2 | 1/2013 | Meyer |
| 8,401,554 | B2 | 3/2013 | Melkote et al. |
| 8,483,169 | B2 | 7/2013 | Melkote et al. |
| 8,599,793 | B2 | 12/2013 | Thomson |
| 2003/0091006 | A1* | 5/2003 | Peltola ............... H04W 36/0085 370/332 |
| 2003/0112766 | A1 | 6/2003 | Riedel et al. |
| 2004/0047324 | A1 | 3/2004 | Diener |
| 2004/0125923 | A1 | 7/2004 | See et al. |
| 2004/0204114 | A1 | 10/2004 | Brennan et al. |
| 2004/0246922 | A1 | 12/2004 | Ruan et al. |
| 2004/0248610 | A1 | 12/2004 | Chan |
| 2005/0068928 | A1 | 3/2005 | Smith et al. |
| 2005/0130650 | A1 | 6/2005 | Creamer et al. |
| 2005/0201330 | A1 | 9/2005 | Park et al. |
| 2005/0271009 | A1* | 12/2005 | Shirakabe ............ H04W 16/10 370/329 |
| 2006/0067290 | A1 | 3/2006 | Miwa et al. |
| 2006/0072502 | A1 | 4/2006 | Crandall |
| 2006/0073827 | A1 | 4/2006 | Vaisanen et al. |
| 2006/0128392 | A1 | 6/2006 | Turina et al. |
| 2006/0165103 | A1 | 7/2006 | Trudeau et al. |
| 2006/0223503 | A1 | 10/2006 | Muhonen et al. |
| 2007/0104126 | A1 | 5/2007 | Calhoun et al. |
| 2007/0201404 | A1 | 8/2007 | Cheon et al. |
| 2007/0249386 | A1 | 10/2007 | Bennett |
| 2008/0057934 | A1* | 3/2008 | Sung ................... H04W 52/243 455/422.1 |
| 2008/0070586 | A1 | 3/2008 | Kermoal et al. |
| 2008/0261602 | A1 | 10/2008 | Livneh |
| 2008/0318576 | A1 | 12/2008 | So et al. |
| 2009/0070694 | A1 | 3/2009 | Ore et al. |
| 2009/0316655 | A1 | 12/2009 | Prakash et al. |
| 2010/0069072 | A1 | 3/2010 | Gogic et al. |
| 2010/0118830 | A1 | 5/2010 | Stephenson et al. |
| 2010/0144365 | A1 | 6/2010 | Pan |
| 2010/0322198 | A1 | 12/2010 | Friday et al. |
| 2011/0087882 | A1 | 4/2011 | Kuo et al. |
| 2011/0096738 | A1 | 4/2011 | Choi |
| 2011/0292898 | A1 | 12/2011 | Wu et al. |
| 2012/0051353 | A1 | 3/2012 | Aragon et al. |
| 2012/0052900 | A1 | 3/2012 | Liu et al. |
| 2012/0128090 | A1 | 5/2012 | Seok |
| 2012/0210001 | A1 | 8/2012 | Ryerson et al. |
| 2012/0282968 | A1 | 11/2012 | Toskala |
| 2012/0322481 | A1* | 12/2012 | Laroche ............... H04W 48/16 455/509 |
| 2013/0036188 | A1 | 2/2013 | Ganu et al. |
| 2013/0041981 | A1 | 2/2013 | Kim et al. |
| 2013/0265943 | A1 | 10/2013 | Melkote et al. |
| 2013/0308447 | A1 | 11/2013 | Cheng et al. |
| 2014/0130149 | A1 | 5/2014 | Tripp |
| 2014/0211756 | A1 | 7/2014 | Bontu et al. |
| 2015/0172998 | A1 | 6/2015 | Tervonen et al. |

OTHER PUBLICATIONS

Final Office Action, U.S. Appl. No. 11/305,910, dated Oct. 5, 2010, pp. 1-21.
Final Office Action, U.S. Appl. No. 13/195,720, dated Aug. 16, 2013, pp. 1-18.
Final Office Action, U.S. Appl. No. 13/195,720, dated Jan. 27, 2015, pp. 1-19.
Ganu, et al.; "Non-Final Office Action issued in U.S. Appl. No. 15/138,663"; dated Nov. 17, 2016, 11 pages.
Non-Final Office Action in U.S. Appl. No. 13/195,720 dated Feb. 8, 2013, 15 Pgs.
Non-Final Office Action, U.S. Appl. No. 11/305,910, dated Jan. 14, 2009, pp. 1-21.
Non-Final Office Action, U.S. Appl. No. 11/305,910, dated Dec. 10, 2009, pp. 1-26.
Non-Final Office Action, U.S. Appl. No. 13/069,218, dated Feb. 15, 2012, pp. 1-25.
Non-Final Office Action, U.S. Appl. No. 13/195,720, dated May 8, 2014, pp. 1-19.
Notice of Allowance, U.S. Appl. No. 11/305,910, dated Jan. 20, 2011, pp. 1-15.
Supplemental Notice of Allowability, U.S. Appl. No. 11/305,910, dated Mar. 8, 2011, pp. 1-6.

* cited by examiner

| CLIENT MAC 220 | SIGNAL STRENGTH 230 | TIME STAMP 240 | CHANNEL 250 | BAND 260 | AP SPECIFIC INFORMATION 270 |
|---|---|---|---|---|---|
| ... | ... | ... | ... | ... | ... |

210

CLIENT TABLE 200

*FIG. 2*

| CLIENT MAC #1 220 | SIGNAL STRENGTH 230 | TIME STAMP 240 | CHANNEL 250 | BAND 260 | AP 180₃ SPECIFIC INFORMATION (BSSID, ASSOCIATED AP IDENTIFIER) 270 |
| | ... | ... | ... | ... | ... |
| | SIGNAL STRENGTH 230 | TIME STAMP 240 | CHANNEL 250 | BAND 260 | AP 180b SPECIFIC INFORMATION (BSSID, ASSOCIATED AP IDENTIFIER) 220 |
| CLIENT MAC #2 | SIGNAL STRENGTH 230 | TIME STAMP 240 | CHANNEL 250 | BAND 260 | AP SPECIFIC INFORMATION (BSSID, ASSOCIATED AP IDENTIFIER) 220 |
| | ... | ... | ... | ... | ... |
| | SIGNAL STRENGTH 230 | TIME STAMP 240 | CHANNEL 250 | BAND 260 | AP SPECIFIC INFORMATION (BSSID, ASSOCIATED AP IDENTIFIER) 220 |
| ... | | | | | CLIENT REPORTS TABLE 300 |

SYSTEM, APPARATUS AND METHOD FOR MANAGING CLIENT DEVICES WITHIN A WIRELESS NETWORK

CROSS-REFERENCE TO RELATED APPLICATIONS

This application is a continuation of U.S. patent application Ser. No. 15/664,923, filed on Jul. 31, 2017, now issued as U.S. Pat. No. 10,057,784, which is a continuation of U.S. patent application Ser. No. 15/138,663, filed on Apr. 26, 2016, now issued as U.S. Pat. No. 9,723,491, which is a continuation of U.S. patent application Ser. No. 14/065,326, filed Oct. 28, 2013, now issued as U.S. Pat. No. 9,326,313, which claims priority to, and is a continuation-in-part of U.S. patent application Ser. No. 13/195,720, filed Aug. 1, 2011, now issued as U.S. Pat. No. 9,936,441, the entire contents of which are incorporated by reference herein. The Applicant hereby rescinds any disclaimer of claim scope in the parent application or the prosecution history thereof and advises the USPTO that the claims in this application may be broader than any claim in the parent application(s).

FIELD

Embodiments of the disclosure relate to the field of wireless digital networks. More specifically one embodiment of the disclosure relates to the management of associations between network devices, notably between at least a client device and an access point.

GENERAL BACKGROUND

Wireless local area networks (WLANs) are becoming ubiquitous. Particularly in locations such as school and businesses, there may be a number of wireless access points (APs) present in an area, each providing a Basic Service Set (BSS) to associated clients (known in the standards as stations, STAs).

The challenge in managing the WLAN is to manage client association, providing the "best" association between a client (STA) and an AP providing a Basic Service Set (BSS).

There are a bewildering number of mechanisms for assisting with this process. Some infrastructure vendors have client software which enables coordination between APs and clients to negotiate a suitable BSS for association. However, most clients, particularly older clients, lack this software support. In such cases, in the IEEE 802.11 infrastructure for example, the WLAN has to infer information about the client's view of the network, and select the proper candidate BSS to handle the client.

The IEEE 802.11k standard (IEEE Std. 802.11k-2008), incorporated herein by reference in its entirety, has proposed different mechanisms on both the 802.11 client and the 802.11 infrastructure so that they are able to co-operatively establish associations with the best BSSID in the client's vicinity. This is done using the 802.11k Beacon Report Information Element that is sent by the 802.11 client (STA) to the infrastructure (AP) in response to a Beacon Request from the AP. The Beacon Report consists of a list of BSS and their properties that the client is able to sense in its vicinity. This provides a standardized mechanism to enable the 802.11 infrastructure to take into account the client's network view to appropriately serve the client via the best available AP/BSS.

Since this standard is relatively new and the implementation has been optional, there are only a few client devices and drivers that support sending Beacon Reports. In the absence of this information, the infrastructure has to infer this based on observations of client traffic.

What is needed is a system, apparatus and method adapted to synthesize reported client information and using this information, along with discovered anomalous behavior by a particular client, to assist with the proper association of this client to a selected radio, namely one or more network devices regulating access to a wireless network and/or transceiver circuitry implemented within the network device, that is better suited for the client and/or the wireless network at large.

BRIEF DESCRIPTION OF THE DRAWINGS

Embodiments of the invention are illustrated by way of example and not by way of limitation in the figures of the accompanying drawings, in which like references indicate similar elements and in which:

FIG. 2 is an exemplary embodiment of a client table included in one or more access points.

FIG. 3 is an exemplary embodiment of a client reports table included in an aggregating (network) device.

DETAILED DESCRIPTION

Figure 1:
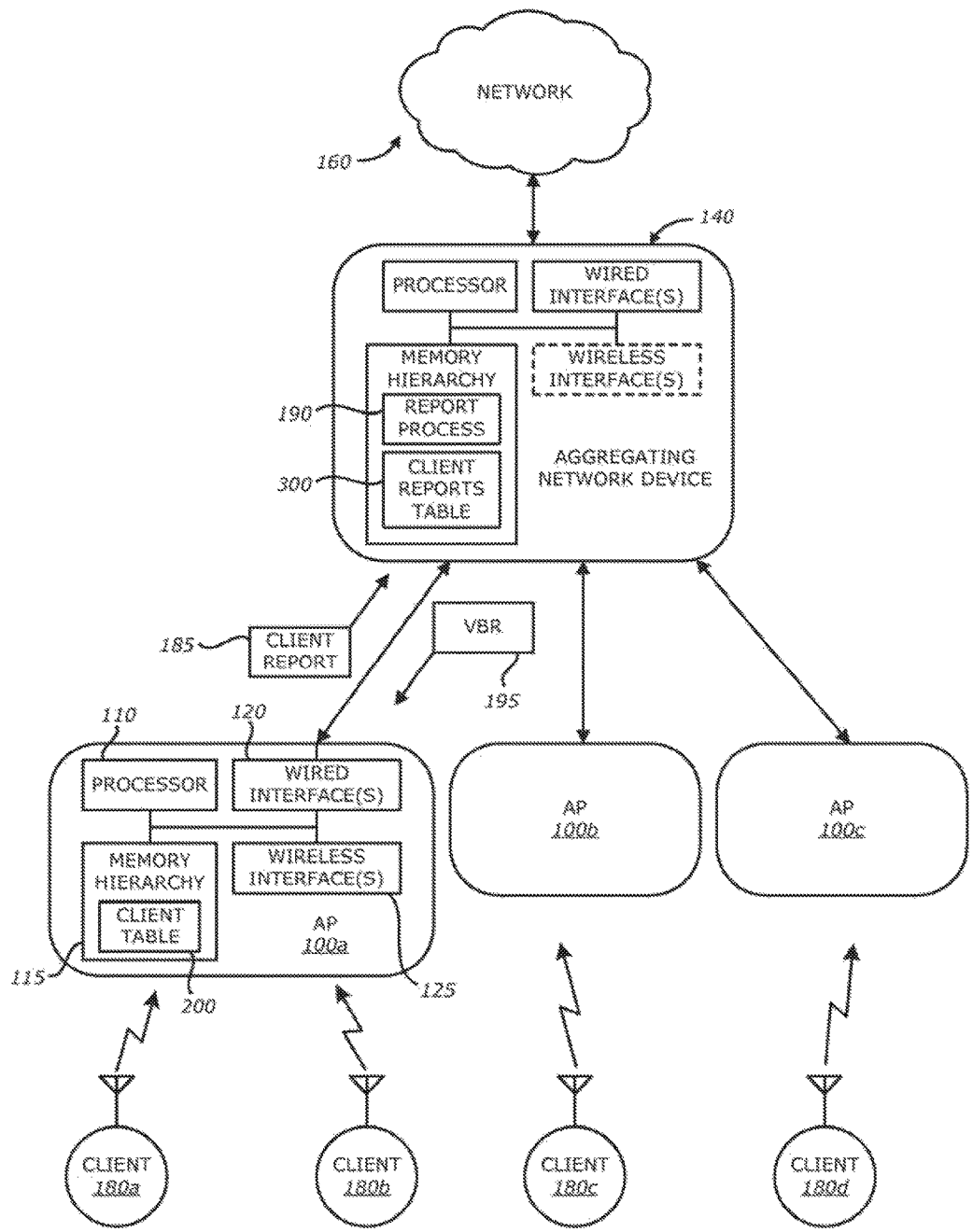
FIG. 1 is an exemplary block diagram of wireless network implemented in accordance with aspects of the invention.

Embodiments of the invention relate to methods of infrastructure-based client management. Access points (APs) maintain tables with client information obtained from signaling detected by the APs and, at some point in time, send this client information as client reports to a report process, operating on a network device, such as a controller for a network, a dedicated host on the network, or one of the networked APs for example, the report process aggregates and organizes the client information provided from the client reports on a per client basis. The aggregated (and organized) client information from the supported APs may be maintained in a table, where one or more entries associated with a particular client device (referred to as a "virtual beacon report") may be subsequently provided to the AP that is currently associated with that client device.

The information within the virtual beacon report may be used by the network device or locally by the AP associated with the particular client device to (i) determine a set of candidate radios (e.g., radios implemented within certain APs or the APs themselves) that is(are) best suited for that client device and (ii) manage wireless association by that client device, the management of the client association may be accomplished by transmission of one or more message(s) to a group of APs, which may include APs that differ from the APs having the candidate radios, in order to "re-steer" (e.g., influence) client association. These message(s) may be in the form of (1) a blacklist report to the group of APs instructing certain APS avoid responding to a request for wireless association by the client device and/or (2) a whitelist report indicating one or more APs that are permitted to respond to such association requests. A selective AP association scheme is described in U.S. patent application Ser. No. 13/653,225 entitled "Method and System to Configure Network Devices," the contents of which are incorporated by reference.

I. Terminology

Herein, certain terminology is used to describe features within embodiments of the invention. For example, the term "network device" generally refers to electronic equipment configured to communicate over a network and/or process information related to such communications. Different categories of network devices may include, but are not limited to (1) a client device being any consumer electronics with wireless network connectivity (e.g., tablet; laptop; desktop; netbook; bar-code scanner; television; set-top box; video gaming control; a digital camera; or a mobile handset with wireless (e.g., WiFi™, WiMAX™, etc.) and/or cellular connectivity such as a smartphone, personal digital assistant "PDA", or the like; (2) an access point (e.g., wired access port, wireless access port, a cellular phone or other network device configured as either a hot spot, router or bridge for another network device, etc.); (3) a data control device (e.g., network switch, controller, etc.); or the like. The network device may be adapted with circuitry to support wireless connectivity with other network devices being part of a wireless network.

An "aggregating device" is a network device that includes hardware circuitry to receive and process information from multiple network devices for subsequent use in managing wireless associations between client devices and those network devices providing access to a network. Examples, of an aggregating device may include a controller, an AP, dedicated host server, or the like.

It is contemplated that a network device includes hardware logic such as one or more of the following: (i) processing circuitry; (ii) one or more communication interfaces such as a radio (e.g., component that handles the wireless data transmission and/or reception) and/or a physical connector to support wired connectivity; and/or (iii) memory hierarchy in the form of a non-transitory computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; etc.); or any connector for receiving a portable memory device such as a Universal Serial Bus "USB" flash drive, portable hard disk drive, or the like.

Herein, the term "logic" is generally defined as hardware and/or software. For example, as hardware, logic may include processing circuitry (e.g., a microcontroller, any type of processor, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, a source code, an object code/a shared library/ dynamic load library, or one or more instructions. These software modules may be stored in any type of a suitable non-transitory storage medium (described above) or transitory computer-readable transmission media (e.g., electrical, optical, acoustical or other form of propagated signals such as carrier waves, infrared signals, digital signals).

The term "link" is a physical or logical communication path between two or more network devices. Hence, a link supports wired, wireless and/or logical communications. Examples of links supporting wired and/or wireless communications may include electrical wiring, optical fiber, cable, bus trace, or a wireless channel using infrared, radio frequency (RF) or any other wired/wireless signaling mechanism. An example of logical communication includes two software components in communication with each other, although they are not physically connected.

The term "report" generally, refers to information transmitted as one or more messages, where each message may be in the form of a packet, a frame, an Asynchronous Transfer Mode (ATM) cell, or any other series of bits having a prescribed format.

Lastly, the terms "or" and "and/or" as used herein are to be interpreted as an inclusive or meaning any one or any combination. Therefore, "A, B or C" or "A, B and/or C" mean "any of the following: A; B; C; A and, B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an Example of the principles, of the invention and not intended to limit the invention to the specific embodiments shown and described.

II. General Architectures

According to one embodiment of the disclosure, as shown in FIG. 1, one or more access points (APs) 100*a*, 100*b*, and/or 100*c* communicate with controller 140, which in turn communicates with a network 160. Aps 100*a*-100*c* support one or more wireless client devices 180*a*, 180*b*, 180*c*, and/or 180*d*.

As is understood in the art, APs 100*a*-100*c* are purpose-built network devices, where each AP (e.g. AP 100*a*) comprises a processor 110, memory hierarchy 115, and input-output interfaces 120 and 125. The memory hierarchy 115 may comprise fast read/write memory for holding processor data and instructions while operating, and nonvolatile memory such as electrically erasable programmable read-only memory (EEPROM) and/or Flash for storing files and system startup information. Wired interface 120 is typically one or more IEEE 802.3 Ethernet interface, used for wired connections to other network devices such as switches, or to a controller. Wireless interface 125 is typically one or more IEEE 802.11 wireless interfaces such as a plurality of radio units operating within different wireless frequency bands (e.g., 2.4 gigahertz "GHz", 5-GHz, etc.). In one embodiment of the disclosure, APs 100a-100c may operate under control of a LINUX® operating system, with purpose-built programs providing host controller and access point functionality.

Controller 140 is a similar purpose-built network device containing a similar hierarchy of processor, memory, and input-output interfaces. Also, wireless client devices 180a, 180b, 180c, and/or 180d are network devices each containing a processor, memory, wireless interface, and other interfaces as needed.

According to the present invention, synthesis of virtual beacon reports begins with the gathering or client and/or AP information from the WLAN infrastructure 10. Each AP 100a, 100b or 100c maintains a client table 200, which is shared among the radios in the AP. An illustrative embodiment of the client table 200 is shown in FIGS. 1 and 2. The client table 200 in the AP 100a may be of limited size, for example 128 entries, with entries aged out as the table 200 fills.

The APs 100a-100c may further contain multiple radios as part of wireless interface 125, for example, radios operating in the 2.4-GHz and 5-GHz wireless bands. Upon receiving a PROBE REQUEST and/or AUTHENTICATION REQUEST message from a client device (e.g. client device 180a), an AP (e.g. AP 100a) measures the signal strength (e.g., signal-to-noise ratio "SNR", received signal strength indicator "RSSI", or an equivalent signal strength reading) of the received message. If this is a new client device, as identified by the client MAC address in the received message, an entry 210 is added to the client table 200. An example of entry 210 includes at least a client Media Access Control (MAC) address 220 and signal strength 230 measured for the received message. Other information such as a timestamp 240, channel 250 and/or band 260 used for communications by AP 100a with client device 130a may also be recorded. If the client MAC address 220 already existed in the table 200, the entry for that client MAC address may be updated with the measured signal strength 230 and/or timestamp 240, but prior measured values may be stored elsewhere in the client table 200 or separate therefrom.

Referring back to FIG. 1, the AP 100a sends a client report 185 to the report process 190 hosted by the aggregating device (e.g. controller 140). As an example, this may occur periodically, such as every "q" seconds (q≥1) for example. Of course, the client report 185 may be transmitted in an aperiodic manner, where the transmission may be triggered by one or more events, such as an update or addition to the client table 200, or a combination of time and events. As an illustrative example, the client report 185 contains at least a list of client MAC addresses 220 and the associated signal strength measurements 230 (e.g., SNRs or equivalents such as RSSI), and may also include additional information such as timestamp 240, channel 250 and/or band 260. The client report 185 may also contain AP specific information 270 associated with the AP uploading that particular client report 185. The AP specific information 270 may include, but is not limited or restricted to channel noise floors, channel loading, AP capabilities, Basic Service Set Identifier (BSSID), an indicator whether the AP is associated with the corresponding client device, or the like. As shown, AP specific information 270 may be stored as part of an appropriate entry in the client table 200 or may be stored separately.

This client reporting process is repeated by the APs 100a, 100b and/or 100c on the network.

According to the invention, a report process 190 is present on the network and is hosted by the aggregating device. As shown, for illustrative purposes, the aggregating device may be controller 140. Alternatively, if no controller is present in the network, the report process may be hosted by one of the APs 100a-100c or may be present on a dedicated host of the wireless network 10. The location of the report process 190 does not matter so long as it is capable of receiving client reports from APs 100a-100c and sending virtual beacon reports 195 back to those APs.

Upon detecting of a triggering event, information within a virtual beacon report (VBR) 195 for & particular client device tinder analysis may be used to prompt alteration of a client association, where the client association is evaluated by the controller 140 or locally by an AP. It is contemplated that a virtual beacon report that corresponds to a particular client device is provided to the AP currently associated with the particular client device.

The report process 190 maintains a client reports (CRs) table 300 for aggregating information associated with client reports received from APs 100a-100c. As shown in FIG. 3, each table entry 310 in the client reports table 300 corresponds to a virtual beacon report and is adapted to contain data provided by different APs (e.g., AP 100a, AP 100b, etc.), where multiple APs (and even multiple radios per AP), detect signaling from the same client device. This data is received from one or more client report 185, and thus, may be as simple as the client MAC address 220 along with signal strength readings 230, or may include timestamp 240 or other additional information such as channel number 250, frequency band 260 or other dedicated AP information 270 such as, noise floor, AP, capabilities, BSSID, indicator whether the AP is associated with the corresponding client device, AP loading, or the like.

As client reports 185 are received from APs 100a-100c, the report process 190 updates the table entry for that client device and the signal strength, (e.g., SNR or equivalent) from the particular AP with its timestamp. New client entries are created as needed. In this manner, the entry 310 in client reports table 300 that is directed to a single client device may contain multiple signal strength measurements (e.g., SNR and/or RSSI) from different APs.

It is contemplated that each client report may have an associated timestamp where successive comparison of signal strength measurements or other data is needed for client association management.

The client reports table 300 may also be limited in size, such as 4096 entries. The specific implementation of the client reports table 300 will depend on the processor architecture and memory capacity of the device.

According to the invention, the client reports table 300 may be used in determining the set of candidate radios accessible by a particular client device upon detecting anomalous behavior by the client device, which constitutes a triggering event and indication of a potential need to re-associate the client device to another radio. This "triggering event" may be detected by the aggregating device or detected locally by the associated AP. Thereafter, data in a virtual beacon report corresponding to the client device (in the client reports table 300) may be evaluated to determine what radio, if any, is "best suited" for the client device, namely what AP-to-client association and/or AP radio provides improved performance for the client device, and/or the wireless network. Illustrative client association evaluation schemes are described below.

As an illustrative example, for a given client device, find the AP/BSS which reported the strongest signal strength (e.g., SNR and/or RSSI) from that client device. This signal strength weighting may be optionally time-weighted so that only recent signal strength values, within a predetermined period, are used and values older in time are ignored. Such a selection may result in a single AP/BSS being identified, or a list of the top "m" (m≥1) APs/BSS may be identified.

In another example where channel utilization is available to the report process, such as through inclusion in the client reports 185, or separate tracking of channel utilization, the AP/BSS which is least loaded may be selected. Load may be measured in terms of the number of client devices associated with a particular AP, and/or channel utilization reported. Similarly, AP noise floor may be used or included in such a calculation.

In another similar example, the AP/BSS on a suitable band (2.4-GHz vs. 5-GHz) for the client device is selected. This selection may be based on characteristics such as band or channel loading, noise floor, AP characteristics such as supported bandwidth, or the like. If, for example, a client device has only reported SNRs for one band, it can be assumed that this client device is single-band only. Often band capability may be inferred by examining the OUI portion of the client MAC address. Similarly, an AP which is operating high bandwidth channels would not be a good candidate for a client device which only supports older legacy 802.11b modes.

In another example, for client devices which have recorded signal strength readings of candidate radios across different channels and different bands, one or more candidate APs/BSS may be selected using a combination of the aforementioned criteria.

In another embodiment, candidate radios may be selected on the basis of policy. As an example, policy may allocate devices to different APs based on device type, which may be inferred from the OUI-portion of the client MAC address, as well as from other client characteristics. Handheld devices such as smart phones and tablets may be directed to one group of APs and laptops to another group of APs. Similarly, devices capable of high-bandwidth modes may be directed to APs which support those high-bandwidth modes, while lower-bandwidth devices are directed away from those high-bandwidth APs. Other policy-based decisions may be based on location, on time of day, or other criteria.

Further according to the invention, upon receiving a client update from an AP, the report process updates the set of best radios for all client devices which are associated with ah AP and sends the virtual beacon report 195 to that AP for the AP to potentially use in client association.

III. Client Association Evaluation Schemes

As described above, the collection of client information at multiple APs and assimilation of the client information spanning the network by the aggregating device has been described. This section further describes the monitoring of a current (actual) operating state of one or more client devices by a network device, where determination of a desired operating state may be based on information provided by two or more APs. Upon detecting anomalous behavior by a client device, normally represented as a triggering event, the network device operates alone, or in combination with another network device, to influence the client device to transition from its current operating state to its desired operating state. This transition may involve changing APs, changing radios within the same AP (e.g. changing frequency band), and/or changing RF channels based on broadcast, multicast or multiple unicast messages.

According to one implementation, this client association evaluation scheme is conducted by an aggregating device being a controller such, as a physical or virtual controller, a designated AP, a dedicated host server, or the like. In another implementation, the AP associated with the client device under analysis conducts the client association evaluation scheme by monitoring metrics for the client device and providing signaling to manage client association if the AP detects anomalous behavior by the client device. The anomalous behavior may be directed to association decisions by the client device that cause reduced operability by the client device and/or wireless network. The AP may receive virtual beacon reports for its associated client devices from the aggregating device via periodic updates in response to the client reports that are out from the AP to the aggregating device.

Figure 4:
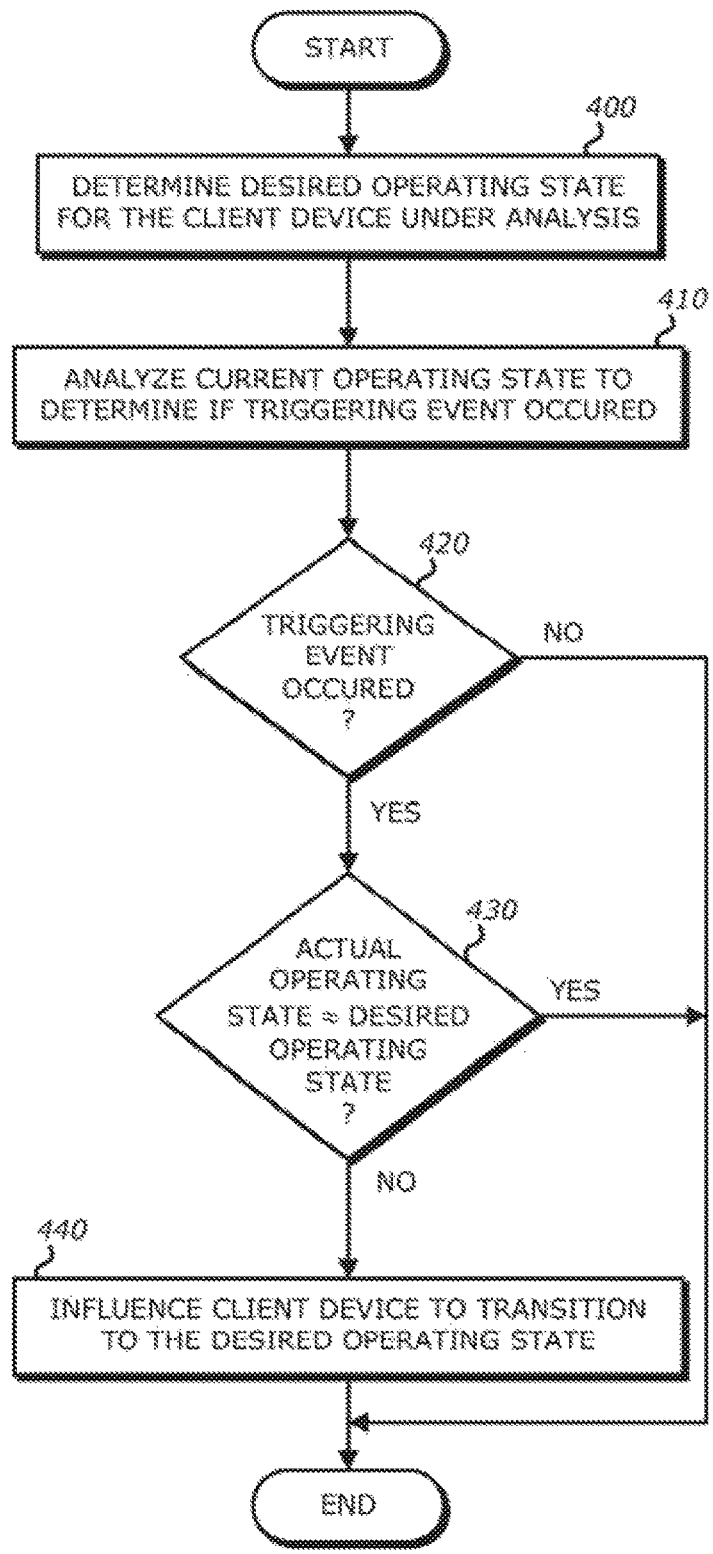
FIG. 4 is an exemplary embodiment of a flowchart outlining the operations of a network device to determine whether to re-steer the client device based on a comparison of the actual operating state of the network device to a desired operating state.

Referring now to FIG. 4, a network device (e.g., controller, AP, etc.) determines the desired operating state for a client device under analysis, based on client information within a virtual beacon report for that client device (block 400). Uploaded from two or more network devices (e.g. APs), the client information within the virtual beacon report may include connectivity metrics (e.g. signal strength), client capabilities, AP/channel/band loads, or the like.

The network device analyzes the current operating state to determine if a triggering event has occurred, where the triggering event denotes anomalous behavior by the client device (blocks 410 and 420). Examples of triggering events that denote detection of anomalous behavior by the client device are illustrated in FIGS. 5A-8. Alternatively, the triggering event may be detected by simply comparing the current operating state in relation to the desired operating state and determining a triggering event based on the differences uncovered within certain parameters, associated with the actual and desired operating states.

For instance, as one illustrative example, a triggering event may be detected upon determining, based on the information provided, by the virtual beacon report, whether another radio provides better signal quality than the current radio in association with the client device. This better signal quality may be based on the other radio receiving from the client signaling having a higher measured signal strength than the measured signal strength for signaling from the client device received by the current radio. Alternatively, the better signal quality may be based on signal strength for signaling from the current radio exceeding a prescribed amount (e.g., percentage, decibel level, etc.) from the measured signal strength for signaling from another radio. As another alternative, the better signal quality may be based on another channel and/or frequency band providing higher valued capabilities that the current channel and/or frequency band used by the client device (e.g., value support of higher QoS levels than signal strength).

In another illustrative example, a triggering event may be detected upon determining whether optimal capabilities of the client match the functionality offered by the radio (e.g., dual-band capable client operating on higher frequency band; client device operating on a particular channel reserved for higher or lower quality of services, etc.). In yet another illustrative example, a triggering event may be detected upon determining whether the current frequency band or channel is overloaded (e.g., possesses at least a prescribed load factor).

If no triggering event is detected (e.g., the current operating state of the client device is substantially equivalent to the desired operating state), the network device does not interfere with the current operating state of the client device. However, in the event that a triggering event has occurred and the current operating state is not equivalent to the desired operating state (e.g. a difference between the desired operating state and the current "actual" operating state exceeds a threshold value), the network device may influence the client device to transition to the desired operating state (block 440).

First, this equivalency may have different levels of comparison. One example of the current operating state being "equivalent" to the desired operating state may occur if the current operating state exactly matches the desired operating state. Another example is where the current operating state is within a certain performance range from the desired operating state, where the transition would only provide marginal performance improvement (e.g., less than 10% improvement). In other words, the difference between the desired operating state and the current operating state does not exceed a threshold value (e.g. threshold=certain differences)

Second, the amount of influence in transitioning to the desired operating state depends on whether the network device is the aggregating device or the AP associated with the client device under analysis. For instance, as illustrative examples, where the network device is the AP associated with the client device, the AP influences the transition by transmitting a Client Steer Request message to the aggregating device (e.g., controller), where the Client Steer Request message includes a BSSID or other identifier for a destination radio targeted for client association. Based on the information within the Client Steer Request message, the aggregating device influences the transition by transmitting a message to a group of APs, where the message identifies a set of candidate radios that may be either (i) suited for such association with a particular client device (whitelist) or (ii) not suited for association with the particular client device (blacklist).

However, where the network device is the aggregating device, the network device merely transmits the message to the group of APs, without receipt of the Client Steer Request message.

Herein, the goal of the client association evaluation scheme is to ensure that the client device is associated to the best link or available candidate radio. There are several triggering events to determine when to consider transitioning a client device to a radio different from the one it is currently associated. Illustrative triggering events are described below, where detection of such triggering events, is described as being conducted by a network device such as an aggregating device (e.g., controller, designated AP, or other network device operating in a centralized capacity) or the AP associated with a particular client device under analysis.

A. Exemplary Triggering Event—Sticky Clients

One of the common problems is that mobile client devices tend to remain associated to APs despite having poor connectivity, which reduces performance of other associated client devices on that AP as well. The prolonged association despite poor connectivity is sometimes referred to as a "sticky association". The following operations may be deployed to determine the presence of a sticky association and transition the client device to a better radio.

1. Connectivity Metric

Figure 5A:
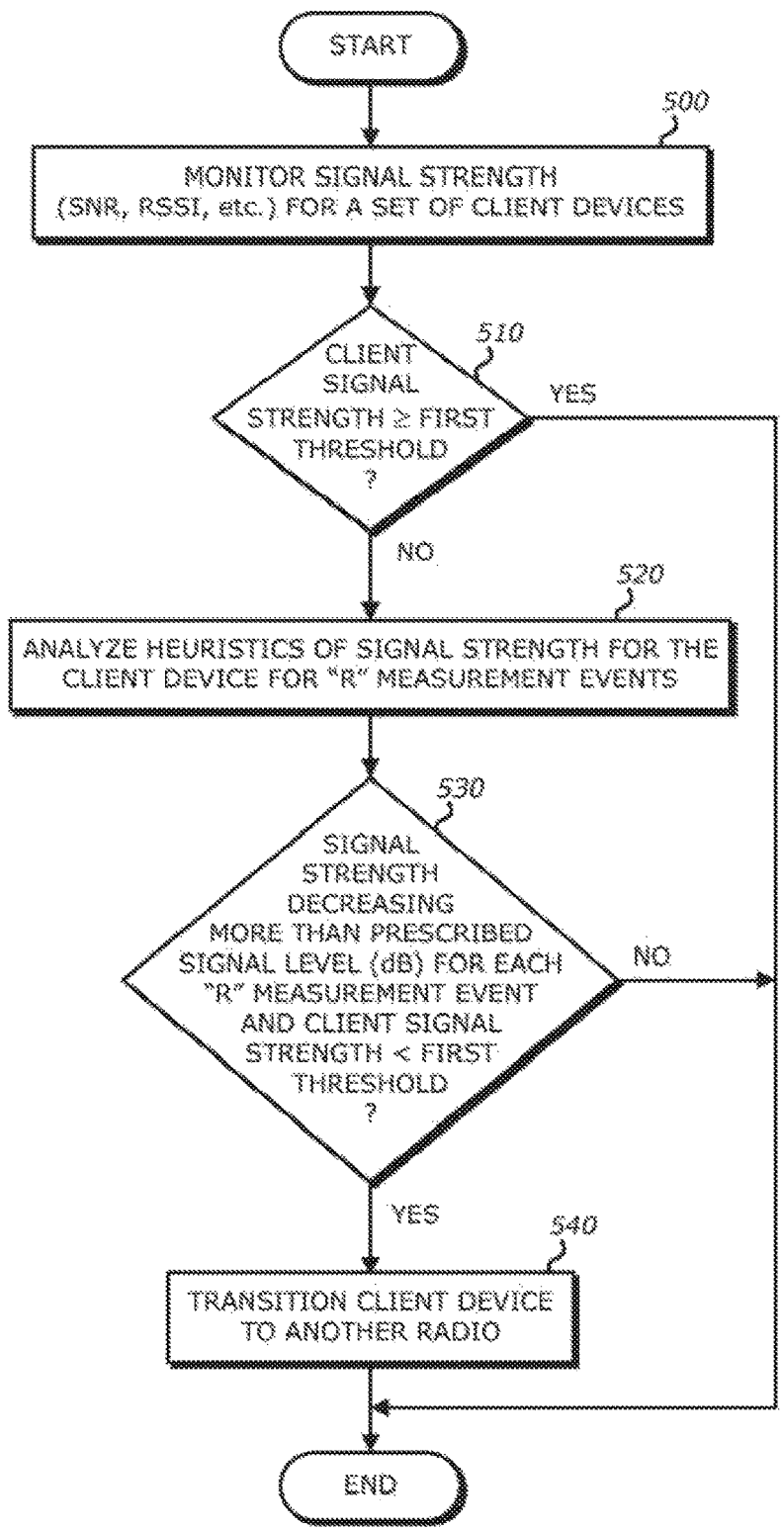
FIG. 5A is an exemplary embodiment of a flowchart outlining the operations of a network device to determine whether to re-steer the client device based on a connectivity metric.

As shown in FIG. 5A, a network device monitors the received signal strength (e.g., SNR, RSSI, etc.) for a set of client devices (block 500). Where the network device is an aggregating device, the set of client devices includes all client devices, that are within an RF neighborhood of the APs communicatively coupled to the aggregating device, where the measured signal strength is provided via client reports. Where the network device is the AP associated with the client device, the set of client devices merely include those client devices that are associated with the AP.

For a client device under analysis, if the client signal strength is greater than or equal to a first threshold (e.g. 25 dB SNR), the network device identifies that the link is acceptable and no transition is requested (block 510). However, if the client signal strength falls below the first threshold, the network device determines if the signal strength measurements indicate that the client device is "moving away" from it's associated AP (blocks 510, 520 and 530). The client device may be considered to be "moving away" from its associated AP when the signal strength level started off greater than the first threshold, but now, the monitored signal strength has lessened by a prescribed amount (e.g., prescribed decibel level) for a predetermined number "R" of measurement events (R≥2) and the monitored signal strength is below the first threshold. For instance, the monitored signal strength has lessened by at least 3 dB for three measurement events (e.g., each measurement event separated by at least a predetermined amount of time) and the monitored signal strength is less than the first threshold (e.g., 25 dB SNR). The measurement events may be consecutive readings prior to the monitored signal strength falling below the first threshold or may be non-consecutive readings.

If the monitored signal strength has lessened by the prescribed amount for a predetermined number of measurement events and the monitored signal strength is below the first threshold, the network device conducts operations to influence the client device to transition to a better radio and link (block 540). This hysteresis-based analysis minimizes unnecessary client transitions due to glitches in signal strength observations.

2. Client Health Metric

Figure 5B:
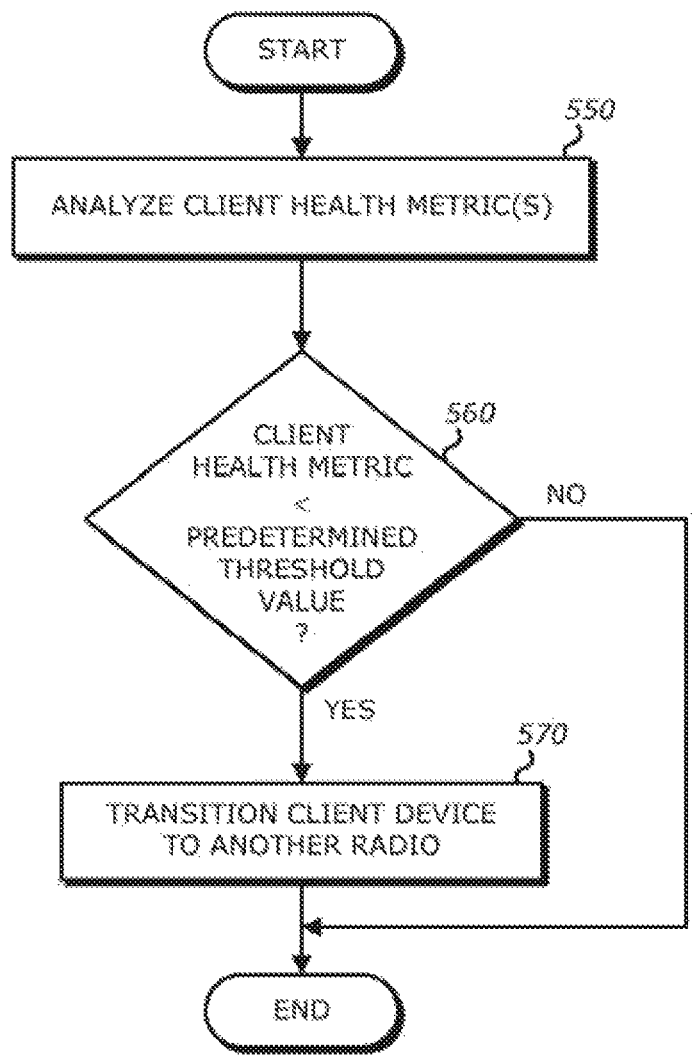
FIG. 5B is an exemplary embodiment of a flowchart outlining the operations of a network device to determine whether to re-steer the client device based on a health metric.

Alternately, in lieu of signal strength criterion, the network device may be adapted to monitor client health metrics for each client device as shown in FIG. 5B. A "client health metric" is a metric that measures the quality of the link between the AP and the client device. For instance, one example of a client health metric includes a ratio between (i) the actual time needed to deliver a particular amount of data (e.g., byte of data), which takes into account data rate and number of retries, and (ii) the ideal time under the best link conditions subject to the capabilities of the client device (e.g., maximum data rate supported and no retries).

Upon analyzing the current health metric and determining that this metric falls below a predetermined threshold value, the network device looks to transition to the client device to another AP (blocks 550-570). Hence, the client health metric may be provided as part of a client report provided from the APs to the network device. The client health metric may be in lieu of, or in addition to, the signal strength metric.

3. Action

Despite whether signal strength or client health metrics are used for the triggering event, the network device analyzes information within the virtual beacon report associated with the client device under analysis, which includes monitored values associated with particular client device for various APs, where some or all of the APs may not be associated with the client device.

If the network device determines that there are one or more radios with a better signal strength (at least 10 dB) on the same band and its absolute signal level is at least −70 dBm, the one or more radios are selected as candidate(s) for steering. If no radio provides better signal strength or link condition, the network device checks other frequency bands for a better signal or link condition. For instance, prior to moving from the 2.4-GHz band to the 5-GHz band or from the 5-GHz band to the 2.4-GHz band, a determination may be made if client load metrics are being exceeded, such as whether the client load metric (e.g., 2.4-GHz/5-GHz client ratio) exceeds a prescribed ratio. For example, the prescribed ratio may be 1:4, as described below.

B. Exemplary Triggering Event—Band Steer

Figure 6:
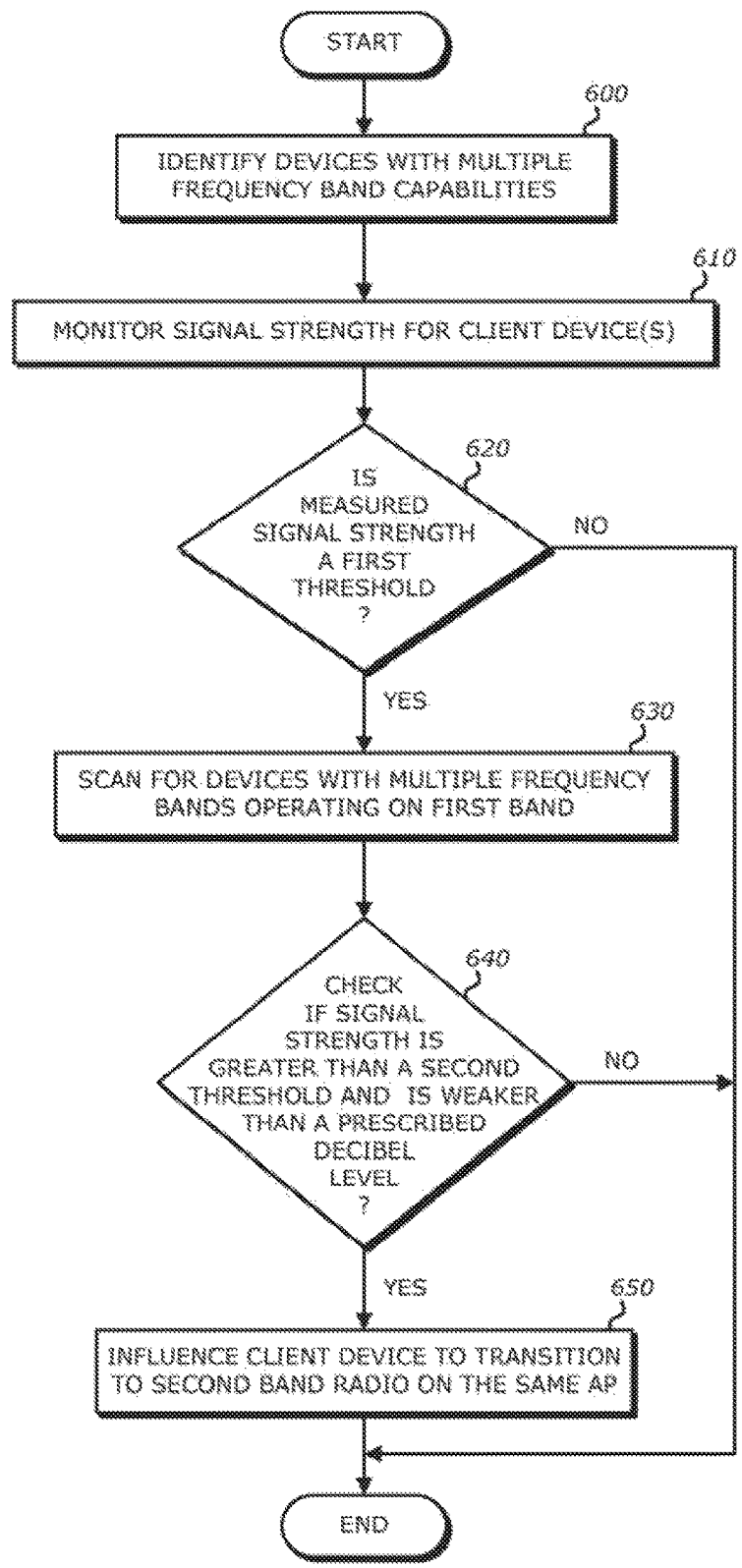
FIG. 6 is an exemplary embodiment of a flowchart outlining the operations of a network device to determine whether to re-steer the client device to a different radio operating within a different frequency band.

Conventionally, band steering attempted to push all 5-GHz capable client devices to an AP supporting 5-GHz, irrespective as to which particular AP would be subsequently associated with the client device. In FIG. 6, the following operations outline how to address the issue that client devices may be steered to 5-GHz radios that may have poor link qualities.

First, client devices that are communicative over two or more frequency bands are identified (block 600). For instance, client devices that are dual-band capable may be identified where both a first frequency band radio (e.g. 2.4-GHz radio) and a second frequency band radio (e.g. 5-GHz radio) for that client device are listed in their corresponding virtual beacon reports.

Next, the network device monitors the signal strength for a particular client device (block 610). If the client signal strength is above a first threshold (e.g. 25 dB), the network device conducts a scan looking for multi-band capable client devices that are currently in communication with a 2.4-GHz radio (blocks 620 and 630).

If the signal strength for the 5-GHz radio deployed on the same AP is greater than a second threshold (e.g. −70 dBm) and is weaker by a certain decibel level (e.g., at most 10 dB) than signaling measured from the 2.4-GHz radio, the network device triggers a transition to the 5-GHz radio on the same AP (blocks 640 and 650). The transition may be triggered by a controller operating as the network device or the associated AP which transmits a Client Steer Request message to the aggregating device.

C. Exemplary Triggering Event—Band Balance

Figure 7:
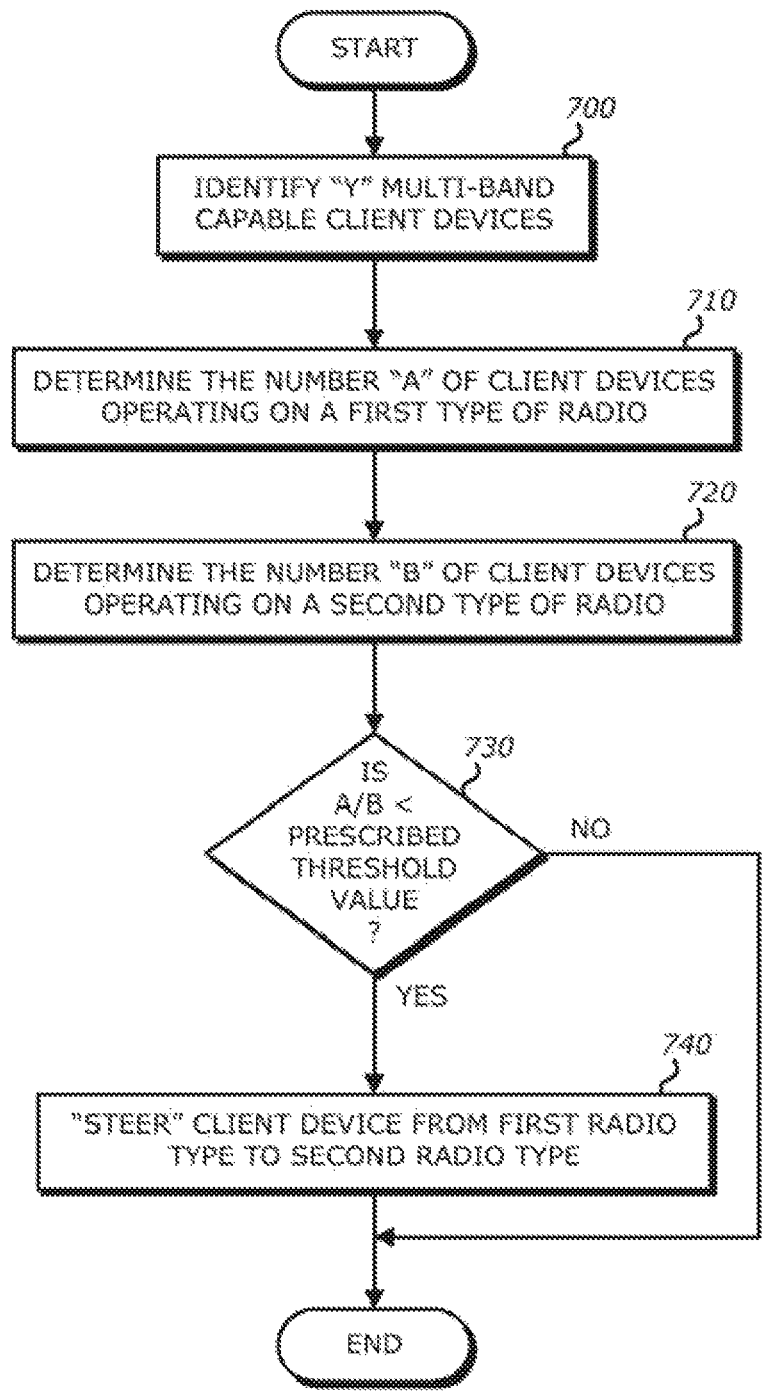
FIG. 7 is an exemplary embodiment of a flowchart outlining the operations of a network device to determine whether to re-steer the client device based on frequency band balancing.
Figure 8:
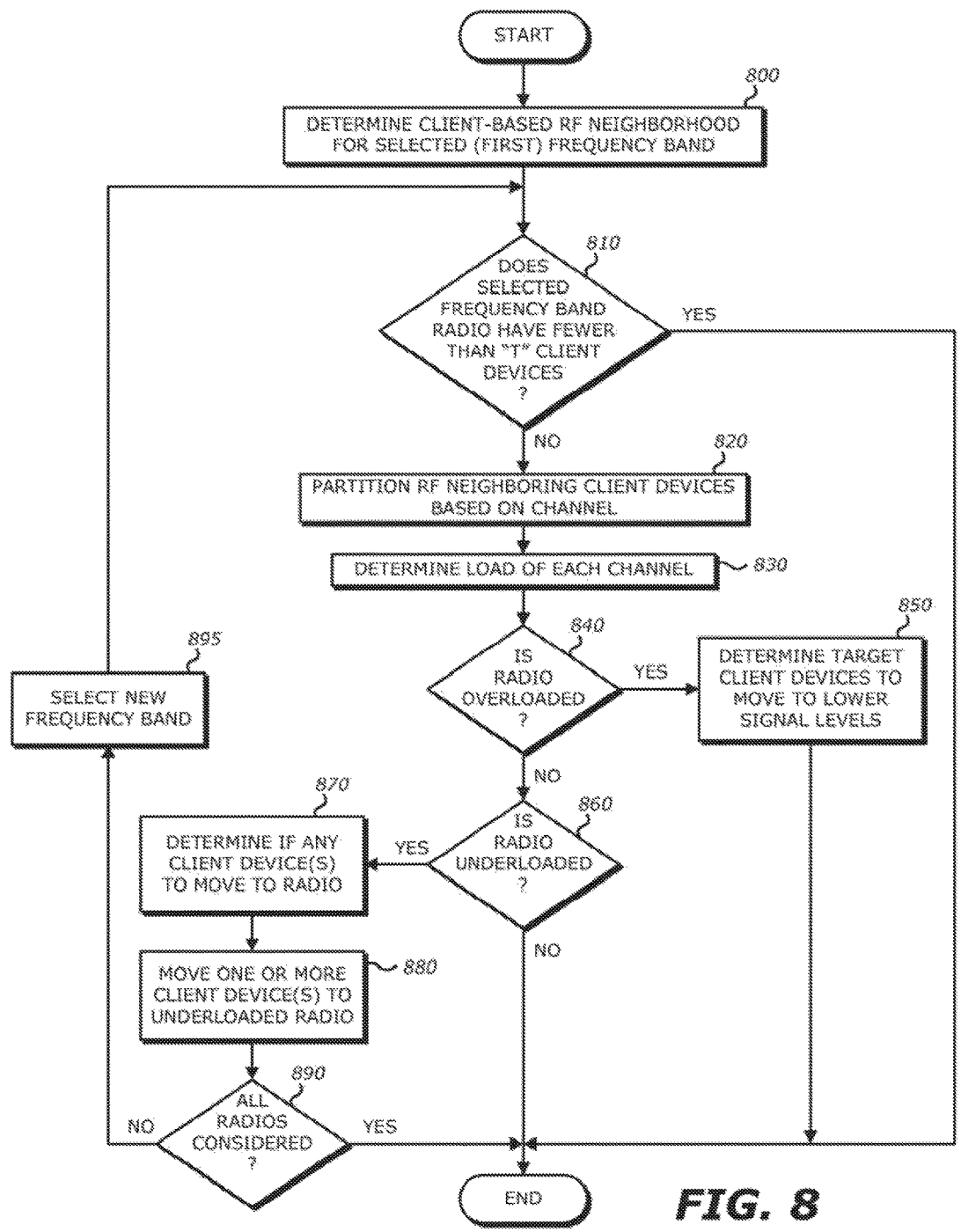
FIG. 8 is an exemplary embodiment of a flowchart outlining the operations of a network device to determine whether to re-steer the client device based on load balancing of client devices.

Referring now to FIG. 7, in the above-described band steering scenario, the measured ratio between the number of client devices operating, in a first frequency band and the number of client devices operating in another frequency band(s) determines whether a client device can transition from the first band to another band. For instance, a determination is made, to identify "Y" client devices that can operate on multiple frequency bands (block 700). Herein, for example, "Y" is the total number of client devices operating on at least two different radio frequencies (e.g., 5-GHz radio and 2.4-GHz radio). Thereafter, as set forth in blocks 710 and 720, a determination is made as to the number "A" of client devices operating on a first type of radio (e.g. 2.4-GHz radio) and a second number "B" of client devices operating on a second type of radio (e.g. 5-GHz radio). If at least a first prescribed number of client devices (A) operate on the first type of radio and a second prescribed number of client devices (B) operate on the second type of radio so that the ratio A/B is less than a prescribed threshold value, no further client devices are steered to use the second radio type without removing a client device from communicating using that second radio type (block 730). Otherwise, the client device may be steered from the first radio type to the second radio type (block 740).

As an illustrative example, the total number of client devices operating on two different radio frequencies (e.g. 5-GHz radio and 2.4-GHz radio) is equal to 17 and the prescribed threshold value (A/B) is set at 1:4. Herein, four client devices (A=4) operate using the first radio type (e.g. 2.4-GHz radio) and twelve client devices (B=13) operate using the second radio type (e.g. 5-GHz radio). The transition ratio is "4:13," which is greater than the prescribed threshold value (1:4). As a transition of a client device using the first radio type (A=4−3) to a second radio type (B=13−14) would produce a ratio of 3:14, which is less than the prescribed threshold value (1:4), the aggregating device would not steer the client device to establish a link with a second radio type.

D. Client Load Balancing

Load balancing of client devices, across APs may be performed centrally on the aggregating device to avoid any conflicting load balance triggers coming from APs and erroneous client device moves. Herein, client devices associate to their preferred APs and then the aggregating device intervenes only if there is a resulting load asymmetry amongst APs in the given RF neighborhood warrants modification. The corresponding client association evaluation scheme is described below in FIG. 8.

Periodically, such as every "X" minutes (e.g., 2 minutes by default), the aggregating, device performs load balancing checks on all terminating APs (block 800). The load balancing checks are done by computing, the client-based RF neighbor hood (hereinafter "RF neighborhood") to determine which APs should be considered for load balancing client devices. For example, the RF neighborhood may be determined from a client device's virtual beacon report where, for every associated client device belonging to a radio, all other radios (spanning both 2.4-GHz and 5-GHz radios) that are in those client device's virtual beacon report, are considered. This RF neighborhood listing may be slightly different than the listing of monitored APs that are maintained and based on passive scanning.

Using the RF neighborhood for load balancing ensures that client devices are balanced amongst only those APs that have reported detecting the client device and avoids accidental steering of client devices to radios that are operating on channels that the client device does hot support (e.g., channels 100-140 in some countries).

One implementation of load balancing described below considers matching the number of client devices per channel in the given RF neighborhood. If a radio has fewer than "T" client devices (default: 10), the radio load balancing operations are skipped (block 810). Otherwise, partition the APs associated with the RF neighborhood based on which channels they are operating on (block 820).

Thereafter, a determination of the load on each channel is conducted by summing up the number of client devices associated to each, radio on that channel (block 830). The target (desired) number of client devices, per channel may be determined using averaging (e.g., total client devices/ number of channels that APs span) for example.

After the load is computed, a determination is conducted as to whether certain radios are overloaded or underloaded (blocks 840 and 860). From overloaded radios, as shown in block 850, determine the target client devices that can be moved (e.g., client devices with lower frequency signal levels). For each underloaded radio, as shown in block 870, a check is conducted against the list of target client devices to transition and determine if the underloaded radio is a good match (e.g., at least 25 dB SNR). If yes, transition the client device to the new radio and mark all of the radios that have been considered already for balancing (block 880).

Therefore, the load adjustment process stops when all radios associated with different wireless frequency bands are considered (blocks 890 and 895). Additionally, we can consider balancing number of client devices within a given channel or consider balancing client devices across radio bands.

IV. Distribution of Virtual Beacon Report

In one embodiment of the invention, the report process produces blacklist reports for each AP. Examining each client device, if the currently associated AP is, not one of the candidate APs/BSS, then the report process includes that particular client information (e.g., the client MAC address) in the blacklist report for that AP. The report process repeats this procedure for all client devices associated to the AP and then sends a client blacklist report to the AP. This client blacklist report may be sent to the AP as example in response to the client update received from the AP.

In this embodiment, each AP maintains a blacklist table. This table may be of limited size, such as 128 entries, and contains at least client MAC addresses, and timestamps. Entries may be aged out of the table, for example after a predetermined time such as 30 seconds. Whenever the AP receives a blacklist report from the report process, the AP adds client devices and timestamps to its blacklist table, or updates the timestamp for a client entry of a client MAC address is, already present in the table. This blacklist table is used to influence client devices away from the AP/BSS that is not appropriate, as determined by the report process.

As an example, when the AP receives a PROBE REQUEST message from a client device that is on the blacklist and has not aged out, the AP does not send a PROBE RESPONSE message.

When an AP receives an AUTHENTICATION REQUEST message from a client device on the blacklist that has not aged put, the AP may choose to not respond, or it may respond with a response code indicating the AP/BSS is loaded or full and cannot accept more connections.

When an AP receives an ASSOCIATION REQUEST message from a client device on the blacklist that has not aged out, the AP sends an ASSOCIATION RESPONSE message indicating that the AP/BSS is loaded or full and cannot accept more connections.

In addition to the embodiment of producing and propagating client blacklists for non-candidate APs, the report process may also generate and propagate client whitelists to corresponding client APs. In the case of a whitelist, an AP only responds to client devices which are on the whitelist.

It should be understood that the steps and processes of the present invention are performed in a plurality of APs on a wireless network, with the report process being hosted on a suitable device on the network such as a controller, a dedicated host, or an access point. Similarly, the client device may be a laptop or desktop computer, tablet, handheld device, or fixed-function device capable of performing the methods described herein.

The present invention may be realized in hardware, software, or a combination of hardware and software. A typical combination of hardware and software may be a network server or access point with software that, when being loaded and executed, controls aspects of the access point and the report process such that they carry out the methods described herein.

This invention may be embodied in other forms without departing from the spirit or essential attributes thereof. Accordingly, reference should be made to the following claims, rather than to the foregoing specification, as indicating the scope of the invention.

What is claimed is:

1. A network device comprising a physical processor that executes machine-readable instructions to cause the network device to:
   determine a plurality of client devices that include multiple frequency band capability operating on a first type of radio of the network device;
   determine a plurality of client devices that include multiple frequency band capability operating on a second type of radio of the network device;
   compare a ratio of the plurality of client devices on the first type of radio and the plurality of client devices operating on the second type of radio to a threshold value;
   cause a subset of the plurality of client devices operating on the first type of radio to operate on the second type of radio in response to the comparison.

2. The network device of claim 1, wherein the subset of the plurality of client devices operate on the second type of radio of the network device in response to the ratio being less than the threshold value.

3. A non-transitory computer-readable medium storing instructions executable by a processing resource that cause a computing device to:
   determine a plurality of client devices that include multiple frequency band capability operating on a first type of radio of the network device;
   determine a plurality of client devices that include multiple frequency band capability operating on a second type of radio of the network device;
   compare a ratio of the plurality of client devices on the first type of radio and the plurality of client devices operating on the second type of radio to a threshold value;
   cause a subset of the plurality of client devices operating on the first type of radio to operate on the second type of radio in response to the comparison.

4. The medium of claim 3, wherein the subset of the plurality of client devices operate on the second frequency band type of radio of the network device in response to the ratio being less than the threshold value.

5. A method, comprising:
   determining a plurality of client devices that include multiple frequency band capability operating on a first type of radio of the network device;
   determining a plurality of client devices that include multiple frequency band capability operating on a second type of radio of the network device;
   comparing a ratio of the plurality of client devices on the first type of radio and the plurality of client devices operating on the second type of radio to a threshold value;
   causing a subset of the plurality of client devices operating on the first type of radio to operate on the second type of radio in response to the comparison.

6. The method of claim 5, wherein the subset of the plurality of client devices operate on the second type of radio of the network device in response to the ratio being less than the threshold value.

\* \* \* \* \*